(12) United States Patent
Maruta

(10) Patent No.: US 6,333,126 B2
(45) Date of Patent: *Dec. 25, 2001

(54) PROCESS FOR PRODUCING NICKEL COMPOUND CONTAINING LITHIUM

(75) Inventor: Junichi Maruta, Kyoto (JP)

(73) Assignee: Japan Storage Battery Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,011

(22) Filed: Jun. 11, 1999

(30) Foreign Application Priority Data

Jun. 12, 1998 (JP) .................................. 10-181439

(51) Int. Cl.$^7$ .................................. H01M 4/52
(52) U.S. Cl. .................. 429/223; 429/46; 429/231.95
(58) Field of Search ............... 429/223, 46, 245, 429/231.95, 231.1; 423/594, 179.5; 205/538–545, 333; 252/182.1

(56) References Cited

U.S. PATENT DOCUMENTS

| | | | |
|---|---|---|---|
| 5,393,622 | * | 2/1995 | Nitta et al. . |
| 5,792,574 | * | 8/1998 | Mitate et al. . |
| 5,981,106 | * | 11/1999 | Amine et al. . |
| 6,015,637 | * | 1/2000 | Mitate et al. . |
| 6,024,934 | * | 2/2000 | Amine et al. . |

OTHER PUBLICATIONS

JP 8–290917 (Patent Abstracts of Japan, vol. 199, No. 703, Nov. 5, 1996).
JP 6–203834 (Patent Abstracts of Japan, vol. 018, No. 551, Jul. 22, 1994).
JP 10–162810 (Patent Abstracts of Japan, vol. 199, No. 811, Jun. 19, 1998).

* cited by examiner

*Primary Examiner*—Tom Dunn
*Assistant Examiner*—Jonathan Johnson
(74) *Attorney, Agent, or Firm*—Sughrue Mion, PLLC

(57) ABSTRACT

In a process for producing a nickel compound containing lithium, a first substance comprising one selected from the group consisting of lithium and lithium compound and a second substance comprising at least one of nickel oxyhydroxide and a derivative thereof are reacted in an organic solvent.

11 Claims, 2 Drawing Sheets

PROCESS FOR PRODUCING NICKEL COMPOUND CONTAINING LITHIUM

BACKGROUND OF THE INVENTION

1. Field of the Invention

Figure 1:
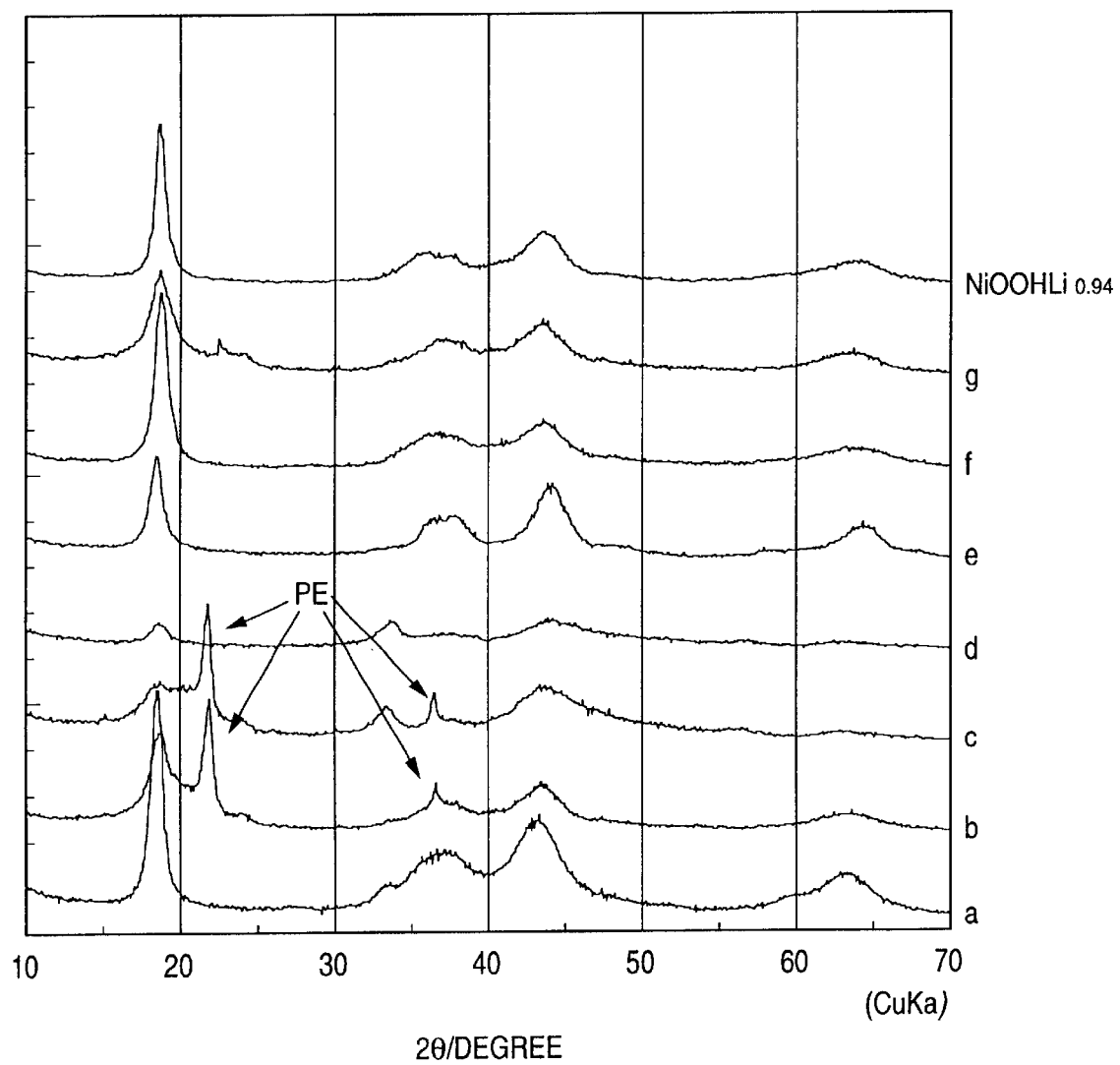

The present invention relates to a process for producing a nickel compound containing lithium and a high capacity nonaqueous electrolytic battery using the nickel compound containing lithium as a positive active material.

2. Description of the Related Art

With the recent development of portable electronic apparatus, it has been desired to develop high performance batteries. A lithium ion battery comprising a carbon material as a negative electrode and lithium cobaltate in the form of lamination composite oxide as a positive electrode has been put into practical use as a nonaqueous electrolytic battery having a high operating voltage and a high energy density. However, since lithium cobaltate is scarce and expensive, lithium-containing manganese composite oxides or lithium nickelate has been proposed as a substitute. These composite oxides are positive active materials for so-called secondary 4 V lithium battery having an average operating voltage of about 4 V.

On the other hand, since the development of interated circuits which operate at a voltage as low as 3 V or lower is under way, or from the standpoint of the safety of battery, it can be presumed that the demand for secondary 3 V nonaqueous electrolytic battery will be growing in the future. However, as positive active materials for secondary 3 V nonaqueous electrolytic battery there have been known only $LiMnO_2$ and $V_2O_5$. Even these materials are much disadvantageous in discharge capacity and cycle life and thus are extremely limited to memory back up in their use.

Further, it has been recently reported that nickel oxyhydroxide can be used as an positive active material for secondary 3 V nonaqueous electrolytic battery (64th Convention of The Electrochemical Society of Japan; Lecture No. 3A06). This report says that nickel oxyhydroxide exhibits an initial discharge capacity as high as 285 mAh/g, which corresponds to a percent utilization of not less than 95%, with its theoretical discharge being about 290 mAh/g. Thus, nickel oxyhydroxide can be fully used for purposes requiring a high energy density battery such as power supply for notebook personal computer. However, since nickel oxyhydroxide is a positive active material in charged state, it cannot be directly combined with an active negative electrode material in discharged state such as graphite to prepare a battery.

Accordingly, either the use of an active negative electrode material in charged state such as graphite having lithium occluded therein, metallic lithium and lithium alloy or the producing of an positive active material in discharged state is essential. From the standpoint of the safety and stability of the active material during the production of battery, the latter approach is preferred. In other words, the use of a nickel compound containing lithium produced by discharging nickel oxyhydroxide as an positive active material and an active material in discharged state such as graphite as an active negative electrode material makes it easier to prepare a battery. Since the positive active material is in discharged state and thus is highly stable to oxygen or water content, the necessity of controlling the exposing atmosphere can be lessened, making it possible to simplify the production facilities and hence add to the advantage in cost.

At present, however, the nickel compound containing lithium as a discharge product of nickel oxyhydroxide can be produced only by the electrochemical reduction of nickel oxyhydroxide in an organic electrolytic solution containing a lithium salt. Accordingly, the application of the foregoing process for producing battery to such a nickel compound containing lithium requires the employment of steps of At previously preparing an electrode comprising nickel oxyhydroxide as an active material, subjecting the nickel oxyhydroxide to an electrochemical process to produce a nickel compound containing lithium as a discharge product, and then washing the material to remove the electrolytic solution therefrom and drying the material. These steps are very difficult to carry out and are disadvantageous in productivity, cost and quality. It has thus been desired to establish a simple and effective process for the synthesis of such a nickel compound containing lithium.

As previously mentioned, nickel oxyhydroxide has been expected to be a most suitable positive active material for secondary 3 V nonaqueous electrolytic battery. However, since nickel oxyhydroxide is in charged state itself, it is necessary that a nickel compound containing lithium in discharged state be used as the positive active material to be combined with graphite or the like as an active negative electrode material in discharged state to prepare a battery. However, no simple and effective process for the synthesis of such a nickel compound containing lithium has been found. It has thus been desired to establish such a synthesis process.

SUMMARY OF THE INVENTION

It is an object of the present invention to provide a simple and effective process for producing a nickel compound containing lithium.

According to the present invention, there are mainly two processes for producing a nickel compound containing lithium. One is a process which comprises allowing lithium or a lithium compound capable of reducing nickel oxyhydroxide and/or derivative thereof and nickel oxyhydroxide and/or derivative thereof to undergo reaction in an organic solvent. The other is a process which comprises reacting a lithium compound having no or relatively weak reducing power with respect to nickel oxyhydroxide and/or derivative thereof with nickel oxyhydroxide and/or derivative thereof in the presence of a substance capable of reducing nickel oxyhydroxide and/or derivative thereof.

The process for producing a nickel compound containing lithium according to the present invention is not an electrochemical process in which the reaction proceeds by an electric energy applied externally to the reaction system, but a process in which the reaction proceeds by the redox power of reactants in the reaction system.

In this manner, a high quality nickel compound containing lithium, for example, as a positive active material for nonaqueous electrolytic battery can be simply obtained. A battery can be safely and simply prepared from the nickel compound containing lithium.

The battery according to the present invention comprises a nickel compound containing lithium according to the foregoing producing process as an positive active material.

BRIEF DESCRIPTION OF THE INVENTION

Figure 2:
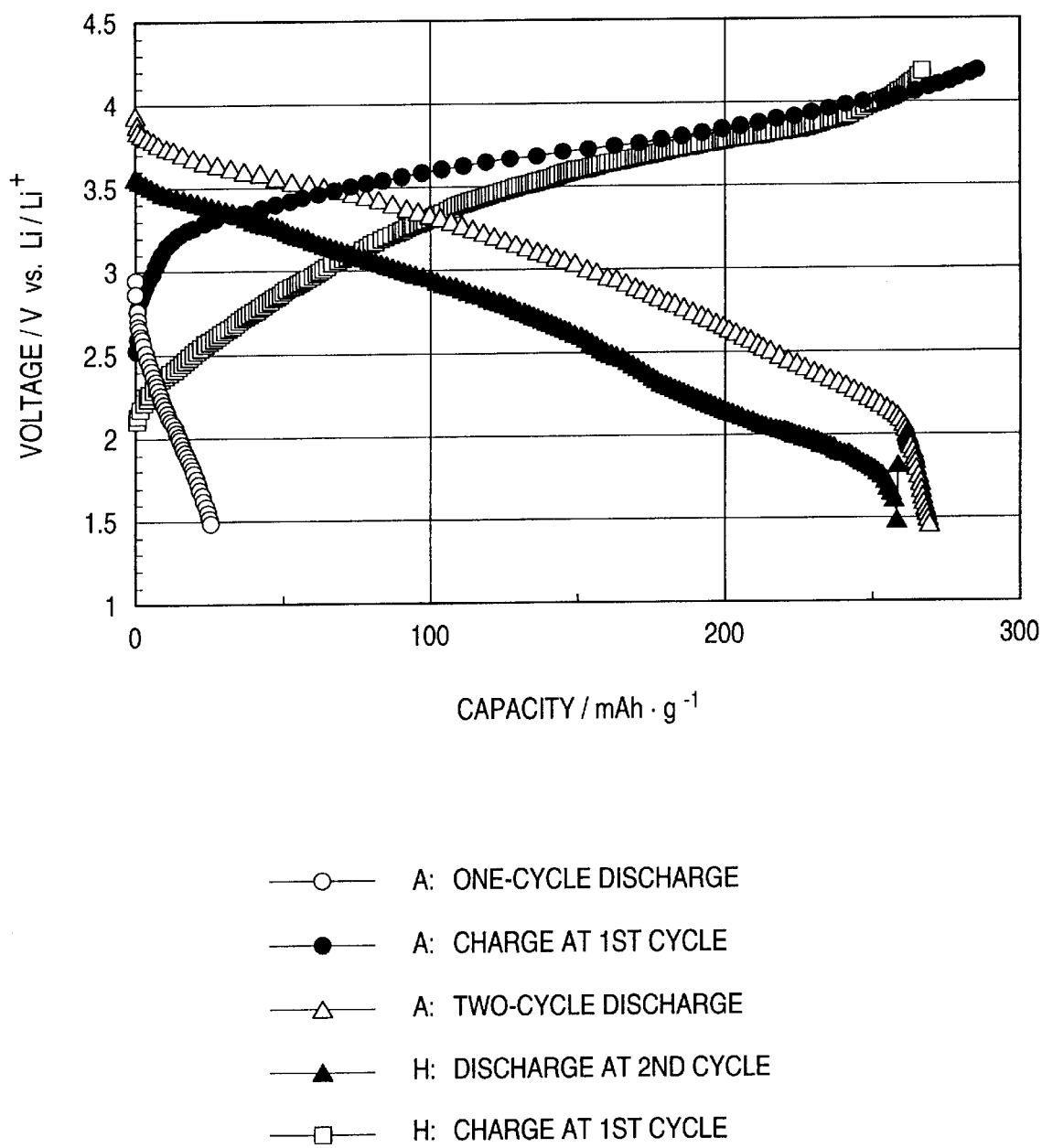

In the accompanying drawings:

FIG. 1 is a graph illustrating the comparison of the positive active materials A, B, C, D, E, F and G and the conventional positive electrode material O in powder X-ray diffraction pattern; and FIG. 2 is a graph illustrating the comparison of the battery A of the present invention and the conventional battery H in charge-discharge properties.

DETAILED DESCRIPTION OF THE INVENTION

Detailed description of the present invention will be described as follows referring to the accompanying drawings.

As previously mentioned, there are mainly two processes for producing a nickel compound containing lithium.

In one process, a lithium or a lithium compound capable of reducing nickel oxyhydroxide and/or derivative thereof and nickel oxyhydroxide and/or derivative thereof is allowed to undergo reaction in an organic solvent.

In the other process, a lithium compound having no or relatively weak reducing power with respect to nickel oxyhydroxide and/or derivative thereof is reacted with nickel oxyhydroxide and/or derivative thereof in the presence of a substance capable of reducing nickel oxyhydroxide and/or derivative thereof.

In one of specific examples of the latter producing process, the substance capable of reducing nickel oxyhydroxide and/or derivative thereof is an organic compound. Specifically, the organic compound is preferably an alcohol. Further, the substance capable of reducing nickel oxyhydroxide and/or derivative and the organic solvent may be the same as each other. Moreover, the substance capable of reducing nickel oxyhydroxide and/or derivative and the organic solvent each may be an alcohol.

The term "nickel oxyhydroxide" as used herein is meant to indicate not only one having a composition close to the stoichiometrical composition represented by the chemical formula NiOOH, i.e., so-called β-NiOOH but also one containing water molecules or alkaline metal cations incorporated in its structure, i.e., γ-NiOOH. The term "nickel oxyhydroxide derivative" as used herein is meant to indicate nickel oxyhydroxide having some of its constituent elements substituted by other elements. For example, one having some of its constituent nickel elements substituted by cobalt or one having some of its constituent hydrogen elements substituted by lithium. For example, a nickel oxyhydroxide derivative having some of its constituent nickel elements substituted by cobalt or zinc is often used as an improved nickel oxyhydroxide as an positive active material for nickel-cadmium battery or nickel-hydrogen battery. Such a nickel oxyhydroxide derivative exhibits physical and chemical properties similar to that of nickel oxyhydroxide and can be prepared by the process for producing a nickel compound containing lithium of the present invention similarly to nickel oxyhydroxide. If a nickel oxyhydroxide derivative is used in the reaction instead of nickel oxyhydroxide, a substance capable of reducing such a nickel oxyhydroxide derivative needs to be used.

Examples of the foregoing substance capable of reducing nickel oxyhydroxide and/or derivative thereof include inorganic substances such as $NaBH_4$, $(i-C_4H_9)_2AlH$, anhydrous hydrazine, $BH_3 \cdot THF$, KI, $H_2$, Na, Cd, Fe, Zn, Li and alloy having hydrogen occluded therein, and organic substances such as formaldehyde, cyclohexanone, cyclopentanone, hydroquinone, p-aminophenol and alcohol. Examples of the alcohol capable of reducing nickel oxyhydroxide and/or derivative thereof include methanol, ethanol, allyl alcohol, benzyl alcohol, and cinnamyl alcohol.

The lithium compound capable of reducing nickel oxyhydroxide and/or derivative thereof is n-butyl lithium, s-butyl lithium, t-butyl lithium, n-hexyl lithium, phenyl lithium, 2-chenyl lithium, lithium iodide, lithium borohydride, lithium aluminum hydride, lithium amide, lithium dimethylamide, lithium diethylamide, lithium diisopropylamide, lithium dicyclohexylamide, lithium bis (trimethylsilyl)amide, lithium trimethylsilanolate, lithium acetylide ethylenediamine complex, lithium(trimethylsilyl) acetylide, lithium phenyl acetylide, lithium 9-BBN hydride, lithium methoxide, lithium ethoxide, lithium isopropoxide, lithium t-butoxide, lithium phenoxide, lithium thiophenoxide, cyclopentadienyl lithium, lithium hydride, and lithium nitride to provide further enhancement in the yield of nickel compound containing lithium.

Preferred examples of the lithium compound having no reducing power with respect to nickel oxyhydroxide and/or derivative thereof include salts having a relatively high solubility in organic solvent such as $LiClO_4$, $LiPF_6$, $LiAsF_6$, $LiBF_4$ and $LiCF_3SO_3$. The reaction of lithium or a substance capable of reducing nickel oxyhydroxide and/or derivative thereof and a lithium compound having no reducing power with respect to nickel oxyhydroxide and/or derivative thereof with nickel oxyhydroxide and/or derivative thereof may be carried out by allowing these components to come in contact with each other in the form of powder or solution in an organic solvent. Alternatively, electrodes prepared from these components may be dipped in an organic solvent where they are allowed to come in electrical contact with each other.

As the substance capable of reducing nickel oxyhydroxide and/or derivative thereof there may be preferably used an organic compound, more preferably an alcohol. The use of such a compound makes it possible to realize the simplification of the reaction system and the reduction of the production cost. The use of an alcohol as a reaction solvent, too, makes it possible to exert the same effect. The use of a salt having a relatively high solubility in organic solvent, preferably $LiClO_4$, $LiPF_6$, $LiAsF_6$, $LiBF_4$ or $LiCF_3SO_3$, as lithium compound having no reducing power with respect to nickel oxyhydroxide and/or derivative thereof makes it possible to raise the lithium ion concentration of the reaction solution, and hence further raise the reaction yield. The simultaneous use of a lithium compound capable of reducing nickel oxyhydroxide and/or derivative thereof and a lithium compound having no or relatively weak reducing power with respect to nickel oxyhydroxide and/or derivative thereof, too, makes it possible to exert the same effect.

EXAMPLES

The present invention will be further described in the following examples, but the present invention should not be construed as being limited thereto.

Example 1

10 g of a nickel oxyhydroxide powder was added to 100 ml of a hexane solution (1.6 M) of n-butyl lithium as a lithium compound capable of reducing nickel oxyhydroxide with stirring in an inert gas atmosphere. The mixture was further stirred for 2 days. The reaction product was washed with the solvent used in the reaction (hexane herein) to remove unreacted n-butyl lithium therefrom, and then dried to obtain a nickel compound containing lithium as positive active material according to the present invention.

The nickel compound containing lithium as positive active material was then mixed with 5 wt-% of acetylene black as an electrically-conducting material and a mixture of 5 wt-% of polyvinylidene difluoride as a binder and 3wt-% of n-methyl-2-pyrrolidole as a binder in a dry room to make a paste. The paste thus obtained was applied to an aluminum net as a collector, and then dried at a temperature of 100° C. to prepare a positive electrode plate having a size of 20 mm×20 mm to be used in the present invention.

A sheet of the positive electrode plate thus prepared, two sheets of lithium metal plates having the same size as the positive electrode as opposing electrodes and 50 ml of a mixture of ethylene carbonate and diethyl carbonate containing 1 M lithium perchlorate were then used to prepare a battery A provided with the positive active material a obtained by the producing process according to the present invention.

Example 2

A battery B provided with an positive active material b obtained by the producing process according to the present invention was prepared in the same manner as in Example 1 except that t-butyl lithium was used instead of n-butyl lithium as a lithium compound capable of reducing nickel oxyhydroxide.

Example 3

A battery C provided with an positive active material c obtained by the producing process according to the present invention was prepared in the same manner as in Example 1 except that phenyl lithium was used instead of n-butyl lithium as a lithium compound capable of reducing nickel oxyhydroxide.

Example 4

A battery D provided with an positive active material d obtained by the producing process according to the present invention was prepared in the same manner as in Example 1 except that lithium amide was used instead of n-butyl lithium as a lithium compound capable of reducing nickel oxyhydroxide.

Example 5

A battery E provided with an positive active material e obtained by the producing process according to the present invention was prepared in the same manner as in Example 1 except that lithium diisopropylamide was used instead of n-butyl lithium as a lithium compound capable of reducing nickel oxyhydroxide.

Example 6

A battery F provided with an positive active material f obtained by the producing process according to the present invention was prepared in the same manner as in Example 1 except that lithium was used instead of n-butyl lithium as a lithium compound capable of reducing nickel oxyhydroxide.

Example 7

A battery G provided with an positive active material g obtained by the producing process according to the present invention was prepared in the same manner as in Example 1 except that ethyl alcohol was used as an organic solvent.

Example 8

A battery H provided with an positive active material h obtained by the producing process according to the present invention was prepared in the same manner as in Example 1 except that $LiClO_4$ was used as a lithium compound having no reducing power with respect to nickel oxyhydroxide and methyl alcohol was used as a substance capable of reducing nickel oxyhydroxide and organic solvent.

Example 9

A battery I provided with an positive active material i obtained by the producing process according to the present invention was prepared in the same manner as in Example 1 except that $LiClO_4$ was used as a lithium compound having no reducing power with respect to nickel oxyhydroxide, lithium iodide was used as a substance capable of reducing nickel oxyhydroxide and acetonitrile was used as an organic solvent.

Example 10

A battery J provided with an positive active material j obtained by the producing process according to the present invention was prepared in the same manner as in Example 1 except that $LiPF_6$ was used as a lithium compound having no reducing power with respect to nickel oxyhydroxide, lithium iodide was used as a substance capable of reducing nickel oxyhydroxide and acetonitrile was used as an organic solvent.

Example 11

A battery K provided with an positive active material k obtained by the producing process according to the present invention was prepared in the same manner as in Example 1 except that $LiAsF_6$ was used as a lithium compound having no reducing power with respect to nickel oxyhydroxide, lithium iodide was used as a substance capable of reducing nickel oxyhydroxide and acetonitrile was used as an organic solvent.

Example 12

A battery L provided with an positive active material l obtained by the producing process according to the present invention was prepared in the same manner as in Example 1 except that $LiClO_4$ was used as a lithium compound having no reducing power with respect to nickel oxyhydroxide, and ethyl alcohol and acetonitrile were used as a substance capable of reducing nickel oxyhydroxide and an organic solvent, respectively, in a volume proportion of 8:2.

Example 13

A battery M provided with an positive active material m obtained by the producing process according to the present invention was prepared in the same manner as in Example 1 except that $LiClO_4$ was used as a lithium compound having no reducing power with respect to nickel oxyhydroxide, and ethyl alcohol and acetonitrile were used as a substance capable of reducing nickel oxyhydroxide and an organic solvent, respectively, in a volume proportion of 1:1.

Example 14

A battery N provided with an positive active material n obtained by the producing process according to the present invention was prepared in the same manner as in Example 1 except that $LiClO_4$ was used as a lithium compound having no reducing power with respect to nickel oxyhydroxide, and ethyl alcohol and acetonitrile were used as a substance capable of reducing nickel oxyhydroxide and an organic solvent, respectively, in a volume proportion of 1:1.

Comparative Example 1

For comparison, a conventional battery O was prepared in the same manner as in Example 1 except that nickel oxyhydroxide was used as an positive active material.

Identification of Product

FIG. 1 illustrates powder X-ray diffraction pattern of the positive active materials obtained in Examples 1 to 7 and the comparative compound obtained by cathodically reducing a nickel oxyhydroxide positive electrode plate in a nonaqueous electrolyte containing a lithium salt. The comparative compound has a chemical formula close to $NiOOHLi_{0.94}$. Since the positive active materials b and c were measured sealed in a polyethylene (PE) bag, the diffraction peak corresponding to PE was observed as well.

Test for Evaluation of Battery

The batteries prepared from the positive active materials obtained in Examples 1 to 7 and the battery of the comparative example 1 were each charged to 4.2 V at a temperature of 25° C. and a current density of 0.1 $mA/cm^2$, and then discharged to 1.5 V at the same current density.

FIG. 2 illustrates the charge-discharge properties of the battery A according to the present invention and the conventional battery O at the first cycle (The test for the battery A began with charging while the test for the conventional battery O began with discharging).

RESULTS OF EVALUATION

In FIG. 1, the positive active materials obtained in Examples 1 to 7 of the present invention showed a good coincidence in X-ray diffraction pattern with the nickel compound containing lithium which had been electrochemically prepared. Further, though not shown, the positive active materials obtained in Examples 8 to 14 showed a good coincidence in X-ray diffraction pattern with those shown in FIG. 1. This demonstrates that the producing process of the present invention makes it possible to synthesize a nickel compound containing lithium chemically rather than electrochemically.

In FIG. 2, the initial charge curve of the battery A of the present invention coincides in shape with the charge curve of the conventional battery O comprising nickel oxyhydroxide as an positive active material which has been initially discharged. The two batteries coincide with each other also in the subsequent charge-discharge properties. Thus, it is sure that the positive active material obtained by the producing process according to the present invention is an active nickel oxyhydroxide material which has been discharged. The batteries B, C, D, E, F, G, H, I, J, K, L, M and N according to the present invention also showed the same charge-discharge properties as the battery A.

Incidentally, if as a lithium compound capable of reducing nickel oxyhydroxide there was selected from the group consisting of s-butyl lithium, n-hexyl lithium, 2-chenyl lithium, lithium iodide, lithium borohydride, lithium aluminum hydride, lithium dimethylamide, lithium diethylamide, lithium dicyclohexylamide, lithium bis(trimethylsilyl) amide, lithium trimethylsilanolate, lithium acetylide ethylenediamine complex, lithium(trimethylsilyl)acetylide, lithium phenyl acetylide, lithium 9-BBN hydride, lithium methoxide, lithium ethoxide, lithium isopropoxide, lithium t-butoxide, lithium phenoxide, lithium thiophenoxide, cyclopentadienyl lithium, lithium hydride and lithium nitride, or if as a lithium compound having no reducing power with respect to nickel oxyhydroxide there was selected from the group consisting of $LiBF_4$ and $LiCF_3SO_3$, a nickel compound containing lithium which can act as a discharged positive active material was obtained.

Further, when various nickel oxyhydroxide derivatives were used instead of nickel oxyhydroxide, similar reaction proceeded to produce a nickel compound containing lithium which can act as a discharged positive active material.

Moreover, as the organic solvent to be used herein there may be used various organic solvents such as hexane and ethyl alcohol.

The present invention concerns a process for producing a lithium nickel-containing oxide. One aspect of the present invention is a process to allow lithium or a lithium compound capable of reducing nickel oxyhydroxide and nickel oxyhydroxide or nickel oxyhydroxide derivative to undergo reaction with each other in an organic solvent. Another aspect of the present invention is a process to allow a substance capable of reducing nickel oxyhydroxide, a lithium compound having no reducing power with respect to nickel oxyhydroxide and nickel oxyhydroxide or nickel oxyhydroxide derivative to undergo reaction with each other in an organic solvent.

In accordance with the present invention, a discharged active nickel oxyhydroxide material can be produced as a high capacity positive active material. Such a discharged active material can be combined with a carbon-based negative electrode which is now widely put into practical use such as graphite far easily than ever to prepare a battery. Further, since such an active material is in discharged state, it can be easily and safely handled. Therefore, the nickel compound containing lithium according to the present invention has an extremely great industrial value.

What is claimed is:

1. A process for producing a nickel compound containing lithium comprising the step of:

allowing (1) metallic lithium and (2) nickel oxyhydroxide and/or a nickel oxyhydroxide having some of its constituent elements substituted by at least one element selected from cobalt, zinc and lithium to undergo reaction in an organic solvent.

2. A process for producing a nickel compound containing lithium comprising the step of:

allowing (1) a lithium compound capable of reducing nickel oxyhydroxide and/or a nickel oxyhydroxide having some of its constituent elements substituted by at least one element selected from cobalt, zinc and lithium and (2) nickel oxyhydroxide and/or a nickel oxyhydroxide having some of its constituent elements substituted by at least one element selected from the group consisting of cobalt, zinc and lithium to undergo reaction in an organic solvent.

3. A process for producing a nickel compound containing lithium, whose nickel valence is lower than three, comprising the step of:

allowing (1) a lithium compound, (2) a substance capable of reducing nickel oxyhydroxide and/or a nickel oxyhydroxide having some of its constituent elements substituted by at least one element selected from cobalt, zinc and lithium and (3) nickel oxyhydroxide and/or a nickel oxyhydroxide having some of its constituent elements substituted by at least one element selected from cobalt, zinc and lithium to undergo reaction in an organic solvent.

4. A process for producing a nickel compound containing lithium, whose nickel valence is lower than three, according to claim 3, wherein said substance capable of reducing nickel oxyhydroxide and/or a nickel oxyhydroxide having some of its constituent elements substituted by at least one element selected from cobalt, zinc and lithium is an organic solvent.

5. A process for producing a nickel compound containing lithium, whose nickel valence is lower than three, according to claim 3, wherein said substance capable of reducing nickel oxyhydroxide and/or a nickel oxyhydroxide having some of its constituent elements substituted by at least one element selected from cobalt, zinc and lithium is an alcohol.

6. A process for producing a nickel compound containing lithium, whose nickel valence is lower than three, according to claim 3, wherein said substance capable of reducing nickel oxyhydroxide and/or a nickel oxyhydroxide having some of its constituent elements substituted by at least one element selected from cobalt, zinc and lithium and said organic solvent are the same as each other.

7. A process for producing a nickel compound containing lithium, whose nickel valence is lower than three, according to claim 3, wherein said substance capable of reducing nickel oxyhydroxide and/or a nickel oxyhydroxide having some of its constituent elements substituted by at least one element selected from cobalt, zinc and lithium and said organic solvent are alcohols.

8. A process for producing a nickel compound containing lithium, whose nickel valence is lower than three, according to claim 3, wherein said substance capable of reducing nickel oxyhydroxide and/or a nickel oxyhydroxide having some of its constituent elements substituted by at least one element selected from cobalt, zinc and lithium is metallic lithium or a lithium compound.

9. A nonaqueous electrolytic battery comprising a nickel compound containing lithium as an active positive electrode material, wherein the nickel compound containing lithium is obtained by a process comprising the step of: allowing (1) metallic lithium and (2) nickel oxyhydroxide and/or a nickel oxyhydroxide having some of its constituent elements substituted by at least one element selected from cobalt, zinc and lithium to undergo reaction in an organic solvent.

10. A nonaqueous electrolytic battery comprising a nickel compound containing lithium as an active positive electrode material, wherein the nickel compound containing lithium is obtained by a process comprising the step of: allowing (1) a lithium compound capable of reducing nickel oxyhydroxide and/or a nickel oxyhydroxide having some of its constituent elements substituted by at least one element selected from cobalt, zinc and lithium and (2) nickel oxyhydroxide and/or a nickel oxyhydroxide having some of its constituent elements substituted by at least one element selected from cobalt, zinc and lithium to undergo reaction in an organic solvent.

11. A nonaqueous electrolytic battery comprising a nickel compound containing lithium as an active positive electrode material, wherein the nickel compound containing lithium, whose nickel valence is lower than three, is obtained by a process comprising the step of: allowing (1) a lithium compound, (2) a substance capable of reducing nickel oxyhydroxide and/or a nickel oxyhydroxide having some of its constituent elements substituted by at least one element selected from cobalt, zinc and lithium and (3) nickel oxyhydroxide and/or a nickel oxyhydroxide having some of its constituent elements substituted by at least one element selected from cobalt, zinc and lithium to undergo reaction in an organic solvent.

* * * * *